(12) United States Patent
Kuravangi-Thammaiah et al.

(10) Patent No.: US 12,464,338 B2
(45) Date of Patent: Nov. 4, 2025

(54) SYSTEMS AND METHODS FOR SYNCHRONIZING SUBSCRIBER DATA AND EVENTS BETWEEN NETWORKS

(71) Applicant: Verizon Patent and Licensing Inc., Basking Ridge, NJ (US)

(72) Inventors: Shanthala Kuravangi-Thammaiah, Keller, TX (US); Ye Huang, San Ramon, CA (US); Helen Osias Eglip, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 700 days.

(21) Appl. No.: 17/658,752

(22) Filed: Apr. 11, 2022

(65) Prior Publication Data
US 2023/0328507 A1    Oct. 12, 2023

(51) Int. Cl.
*H04W 8/20* (2009.01)
*H04W 36/14* (2009.01)

(52) U.S. Cl.
CPC ............. *H04W 8/20* (2013.01); *H04W 36/14* (2013.01)

(58) Field of Classification Search
CPC .................... H04W 8/20; H04W 36/14
USPC ........................................... 370/331
See application file for complete search history.

(56) References Cited

U.S. PATENT DOCUMENTS

| | | | |
|---|---|---|---|
| 2019/0253917 A1* | 8/2019 | Dao ............... | H04W 76/27 |
| 2021/0377721 A1* | 12/2021 | Zhou ............... | H04W 8/065 |
| 2022/0248361 A1* | 8/2022 | Long ............... | H04W 8/10 |
| 2023/0164538 A1* | 5/2023 | Zhu ................. | H04W 8/18 |
| | | | 455/414.1 |
| 2023/0171587 A1* | 6/2023 | Merino Vazquez .... | H04L 61/50 |
| | | | 455/422.1 |
| 2024/0187968 A1* | 6/2024 | Tiwari ............. | H04W 8/20 |

* cited by examiner

*Primary Examiner* — Jae Y Lee
*Assistant Examiner* — Haeshil Jessica Choi

(57) ABSTRACT

In some implementations, a network device may store first data associated with a monitoring event, wherein the first data is associated with a subscriber and is stored as persistent data in a memory associated with the network device. The network device may receive second data associated with an occurrence of the monitoring event. The network device may determine that the second data indicates a change to the first data. The network device may provide the second data to a network exposure function (NEF) based on the second data indicating the change to the first data, wherein the second data is not provided to the NEF when the second data does not indicate the change to the first data.

20 Claims, 11 Drawing Sheets

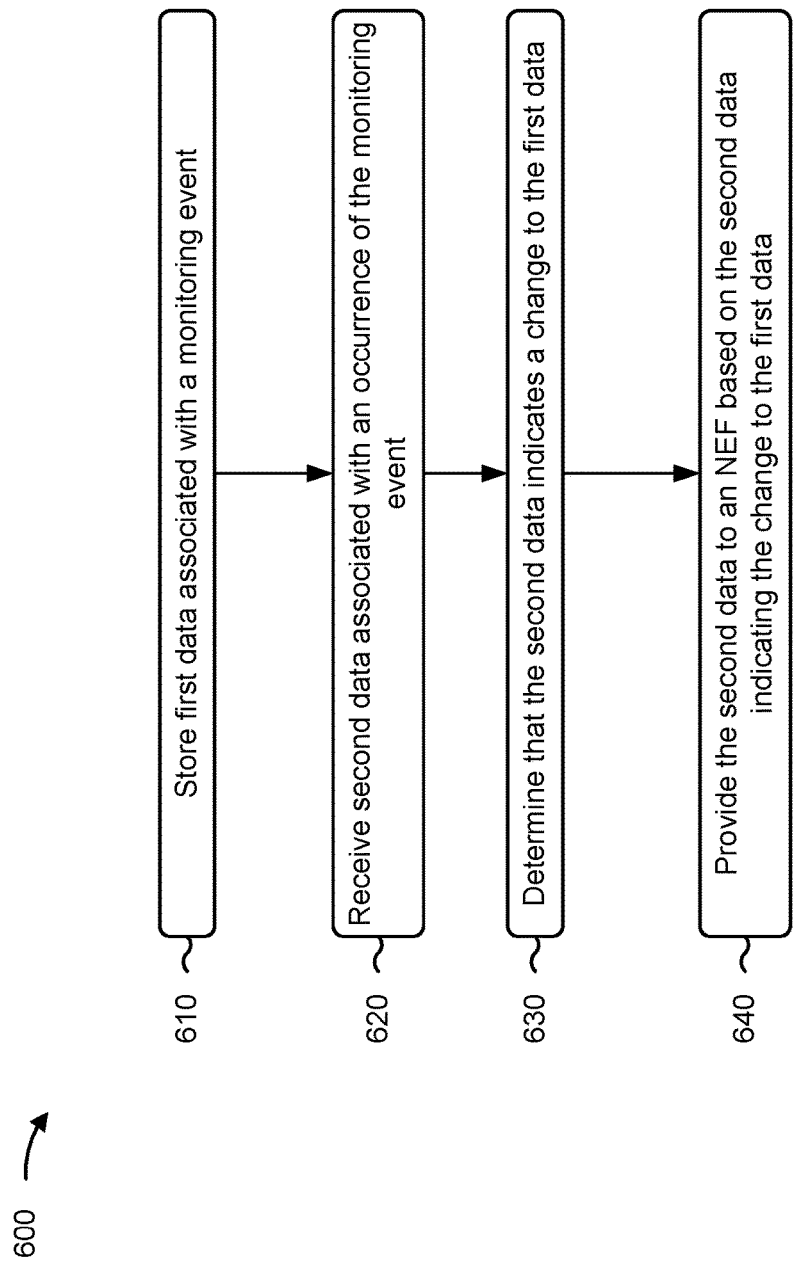

SYSTEMS AND METHODS FOR SYNCHRONIZING SUBSCRIBER DATA AND EVENTS BETWEEN NETWORKS

BACKGROUND

A universal integrated circuit card (UICC), often referred to as a subscriber identification module (SIM) or SIM card, is a smart card that is often included in an electronic device and used to access Global System for Mobile communications (GSM) networks, Universal Mobile Telecommunications System (UMTS) networks, Long-Term Evolution (LTE) networks, Fifth Generation (5G) networks, and/or the like. For example, the UICC may securely store information used to identify and authenticate a subscriber on a wireless network associated with a particular mobile network operator (MNO).

BRIEF DESCRIPTION OF THE DRAWINGS

FIG. 6 is a flowchart of an example process relating to synchronizing subscriber data and events between networks.

DETAILED DESCRIPTION OF EXAMPLE EMBODIMENTS

Figure 1A:
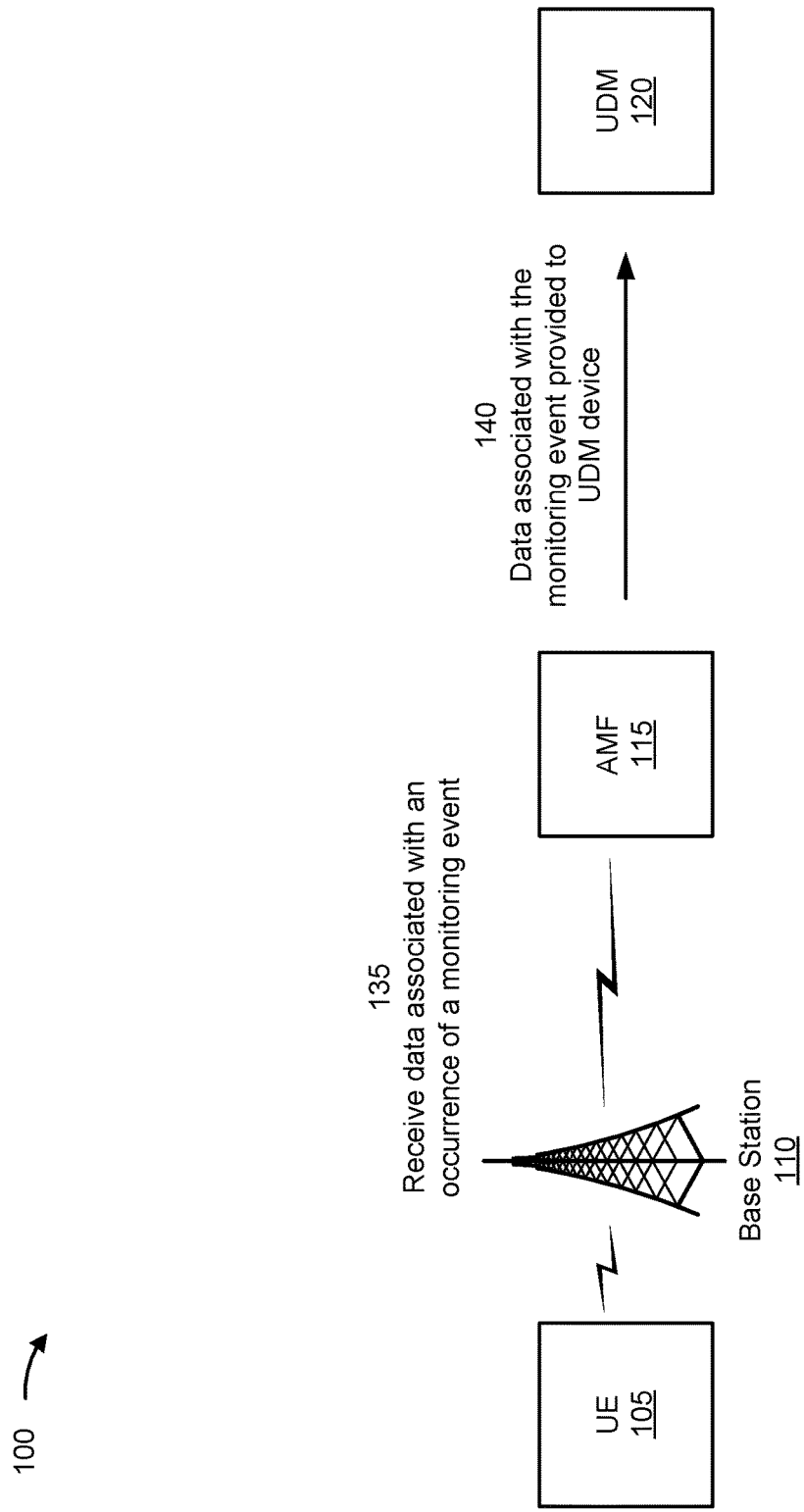
FIGS. 1A-1D are diagrams of an example associated with synchronizing subscriber data and events between networks.

The following detailed description of example implementations refers to the accompanying drawings. The same reference numbers in different drawings may identify the same or similar elements.

In some cases, the UICC may be associated with a subscription permanent identifier (SUPI) that is used to identify and authenticate a subscriber on a wireless network. For example, the User Equipment (UE) may provide the SUPI to the network when connecting to the network.

Additionally, the UE may provide a permanent equipment identifier (PEI) to the network. The PEI may be an identifier that is associated with the UE (rather than the UICC or the subscriber) and may be used to uniquely identify the UE on the network. For example, the PEI may be included in access and mobility management function (AMF) registration data when the UE connects to a 5G network.

The network may store the SUPI, the PEI, and/or information indicating an association between the SUPI and the PEI as part of UE context data associated with the UE. The network may maintain the UE context data while the UE is registered with the network. For example, a unified data management (UDM) device associated with a 5G network may receive the SUPI and the PEI for a UE when the UE registers with the 5G network. The UDM device may store the SUPI, the PEI, and/or information indicating an association between the SUPI and the PEI as part of UE context data associated with the UE. The UDM device may maintain UE context data while the UE is registered with the 5G network.

Additionally, the UDM device may report the association between the SUPI and the PEI to a network exposure function (NEF) associated with the 5G network. The UDM device may report the association between the SUPI and the PEI to the NEF for all subscribers monitored by the UDM device upon each occurrence of a monitoring event (e.g., a UE registering with the 5G network, a handoff from the 5G network to another network (e.g., an LTE network), or a handoff from another network to the 5G network). However, because the UE context data is maintained only while the UE is registered with the 5G network, the UDM device may be unable to determine whether the association between the SUPI and the PEI has changed and may report the association between the SUPI and the PEI to the NEF for each monitoring event occurring for each monitored subscriber.

Additionally, a home subscriber server (HSS) associated with an LTE network may synchronize PEI information (e.g., information indicating an association between a SUPI and a PEI) with the UDM when a UE attaches to the LTE network, for each handoff from the 5G network to the LTE network, and for each handoff from the LTE network to the 5G network. Because the HSS is not aware of the subscribers monitored by the UDM device, the HSS attempts to synchronize PEI information with the UDM device for every subscriber on the network.

Some implementations described herein enable a UDM device to receive data associated with a monitoring event (e.g., PEI information) and/or to report data associated with a monitoring event when there is a change to the data and/or when the data is associated with a subscriber monitored by the UDM device. For example, the UDM device may subscribe to an HSS to receive data associated with a monitoring event for a particular subscriber. Upon an occurrence of a monitoring event associated with a subscriber (e.g., a UE associated with a subscriber), the HSS may determine whether the UDM device is subscribed to receive data associated with the subscriber and whether the data has changed. The HSS may provide the data to the UDM device when the UDM device is subscribed to receive data associated with the subscriber and when the data has changed. Additionally, when the UDM device receives data associated with an occurrence of a monitoring event (e.g., from the HSS and/or a device included in a network associated with the UDM device (e.g., an AMF device)), the UDM device may store the data as persistent data (rather than as UE context data that is maintained only while the UE is registered with the network).

In some implementations, because the UDM device stores the data as persistent data, the UDM device may be able to determine whether the data has changed. The UDM device may report the data to the NEF when the data has changed. As a result, the amount of data transmitted between the HSS and the UDM device and/or the amount of data transmitted to the NEF may be reduced, which may conserve computing resources (e.g., processor resources, memory resources, and/or communication resources) that may otherwise be utilized to transmit data associated with every monitoring event.

FIGS. 1A-1D are diagrams of an example 100 associated with synchronizing subscriber data and events between networks. As shown in FIGS. 1A-1D, example 100 includes a UE 105, a base station 110, an AMF 115, a UDM device 120, a unified data repository device (UDR) 125, and an NEF 130. The UE 105, the base station 110, the AMF 115, the UDM device 120, the UDR 125, and the NEF 130 are described in greater detail below with respect to FIGS. 3-5.

As shown in FIG. 1A, and by reference number 135, the AMF 115 may receive data associated with an occurrence of a monitoring event. For example, the monitoring event may include an occurrence of the UE 105 connecting to, or registering with, a network associated with the base station 110.

In some implementations, the data associated with the monitoring event may include a SUPI associated with a UICC of the UE 105. The SUPI may include an identifier that uniquely identifies a subscriber (e.g., a user) associated with the UE 105 in the network. For example, the SUPI may include a mobile subscriber identification number (MSIN) associated with a user of the UE 105.

In some implementations, the data associated with the monitoring event may include a PEI associated with the UE 105. The PEI may include an identifier that uniquely identifies the UE 105 in the network. For example, the PEI may include an international mobile equipment identity (IMEI) associated with the UE 105.

As shown by reference number 140, the AMF 115 may provide the data associated with the occurrence of the monitoring event to the UDM device 120. For example, the AMF 115 may provide the SUPI, the PEI, and information indicating that the SUPI is associated with the PEI to the UDM device 120 based on the occurrence of the monitoring event and/or based on receiving the data associated with the monitoring event from the UE 105.

In some implementations, the UDM device 120 may determine whether data associated with a monitoring event for the subscriber and/or the UE 105 is stored in the UDR 125. In some implementations, the UDM device 120 may determine that the data associated with the monitoring event for the subscriber and/or the UE 105 is stored in the UDR 125 and the UDM device 120 may perform one or more actions, as described below.

Figure 1B:
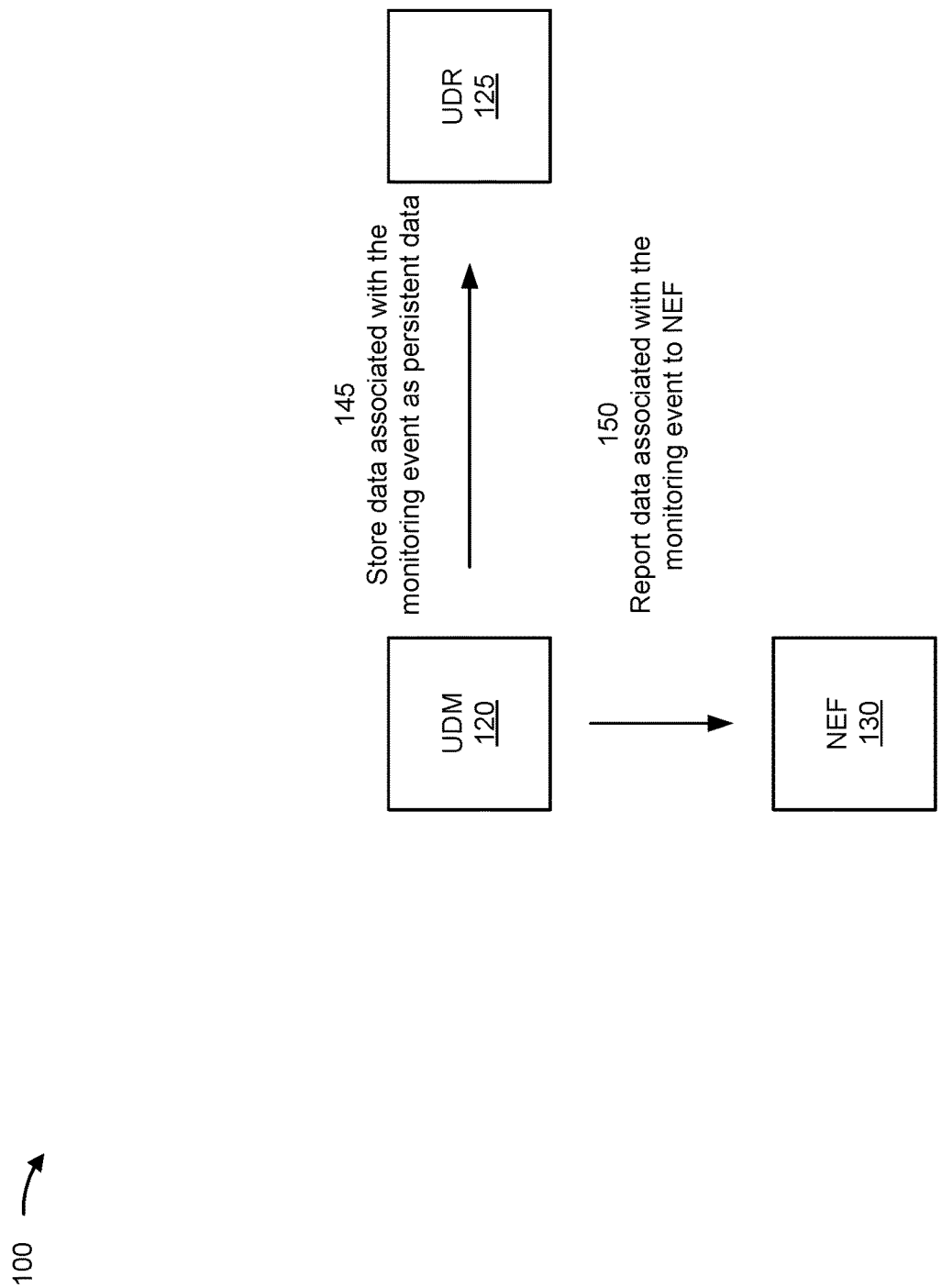

In some implementations, the UDM device 120 may determine that the data associated with the monitoring event for the subscriber and/or the UE 105 is not stored in the UDR 125. As shown in FIG. 1B, and by reference number 145, the UDM device 120 may store the data associated with the occurrence of the monitoring event as persistent data associated with the subscriber and/or the UE 105. For example, the UDM device 120 may store the data associated with the monitoring event in a data structure (e.g., a database, a table, and/or a list, among other examples) that associates SUPIs with PEIs. In some implementations, the data structure may be stored in the UDR 125. The UDM device 120 may maintain the data associated with the monitoring event in the data structure after an expiration of a registration of the UE 105 with the network. In some implementations, the UDM device 120 may store the data associated with the occurrence of the monitoring event as identity data associated with the subscriber associated with the UE 105.

As shown by reference number 150, the UDM device 120 may report the data associated with the occurrence of the monitoring event to the NEF 130. The UDM device 120 may report the data associated with the monitoring event to the NEF 130 based on the data associated with the monitoring event for the subscriber not being stored in the UDR 125 and/or based on the monitoring event corresponding to the UE 105 registering with the network.

Figure 1C:
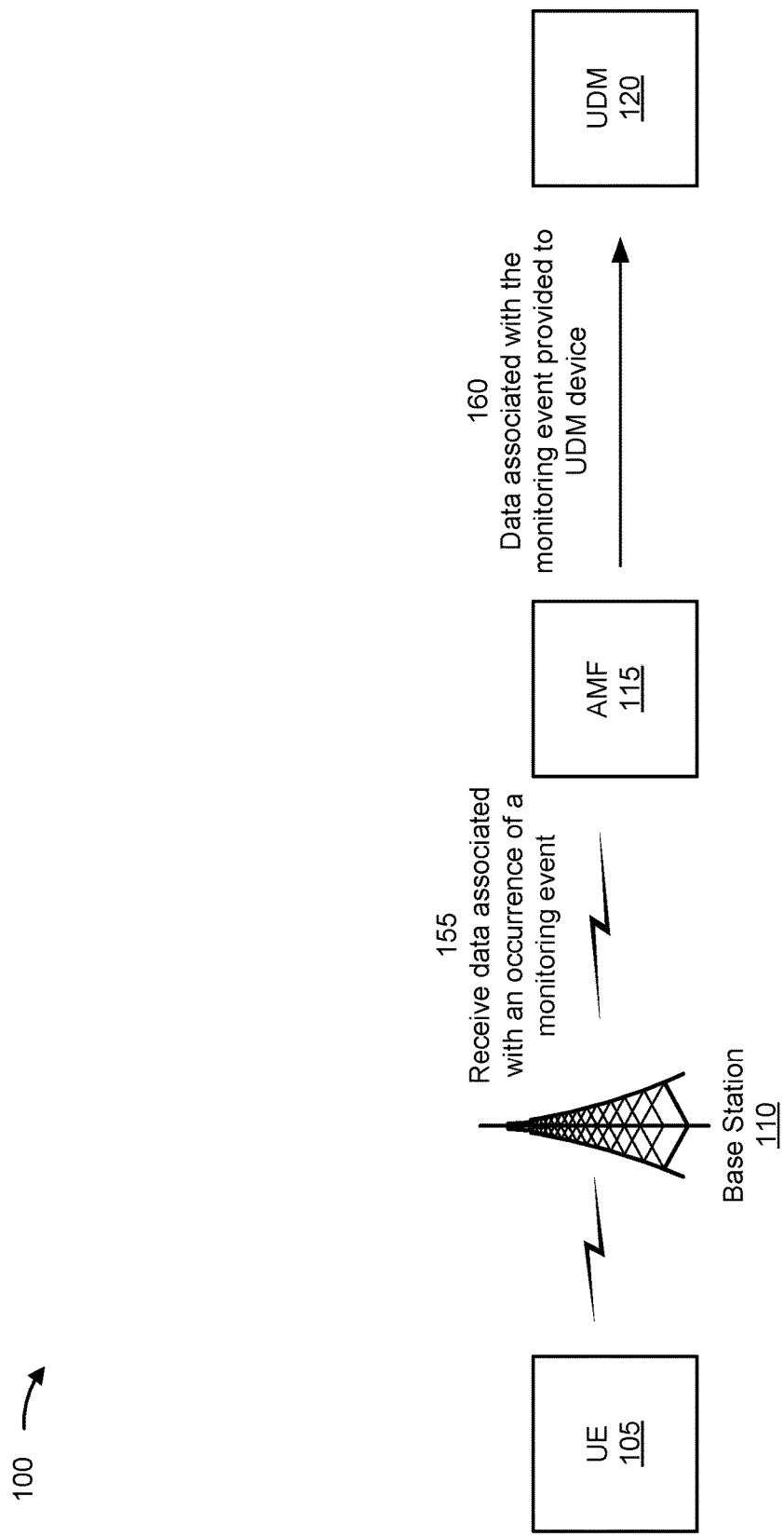

As shown in FIG. 1C, and by reference number 155, the AMF 115 may receive data associated with an occurrence of a monitoring event. For example, the AMF 115 may receive the data associated with the occurrence of the monitoring event based on the UE 105 being handed over to another network (e.g., an LTE network, as described in greater detail below with respect to FIGS. 2A-2C). In some implementations, the data associated with the monitoring event may include a SUPI associated with the UICC and/or the PEI associated with the UE 105.

As shown by reference number 160, the AMF 115 may provide the data associated with the monitoring event to the UDM device 120. In some implementations, the AMF 115 may provide the data associated with the monitoring event to the UDM in a manner similar to that described above.

In some implementations, the UDM device 120 may determine whether data associated with a monitoring event for the subscriber and/or the UE 105 is stored in the UDR 125. In some implementations, the UDM device 120 may determine that the data associated with the monitoring event for the subscriber and/or the UE 105 is not stored in the UDR 125. The UDM device 120 may store the data associated with the monitoring event as persistent data in a manner similar to that described above.

Figure 1D:
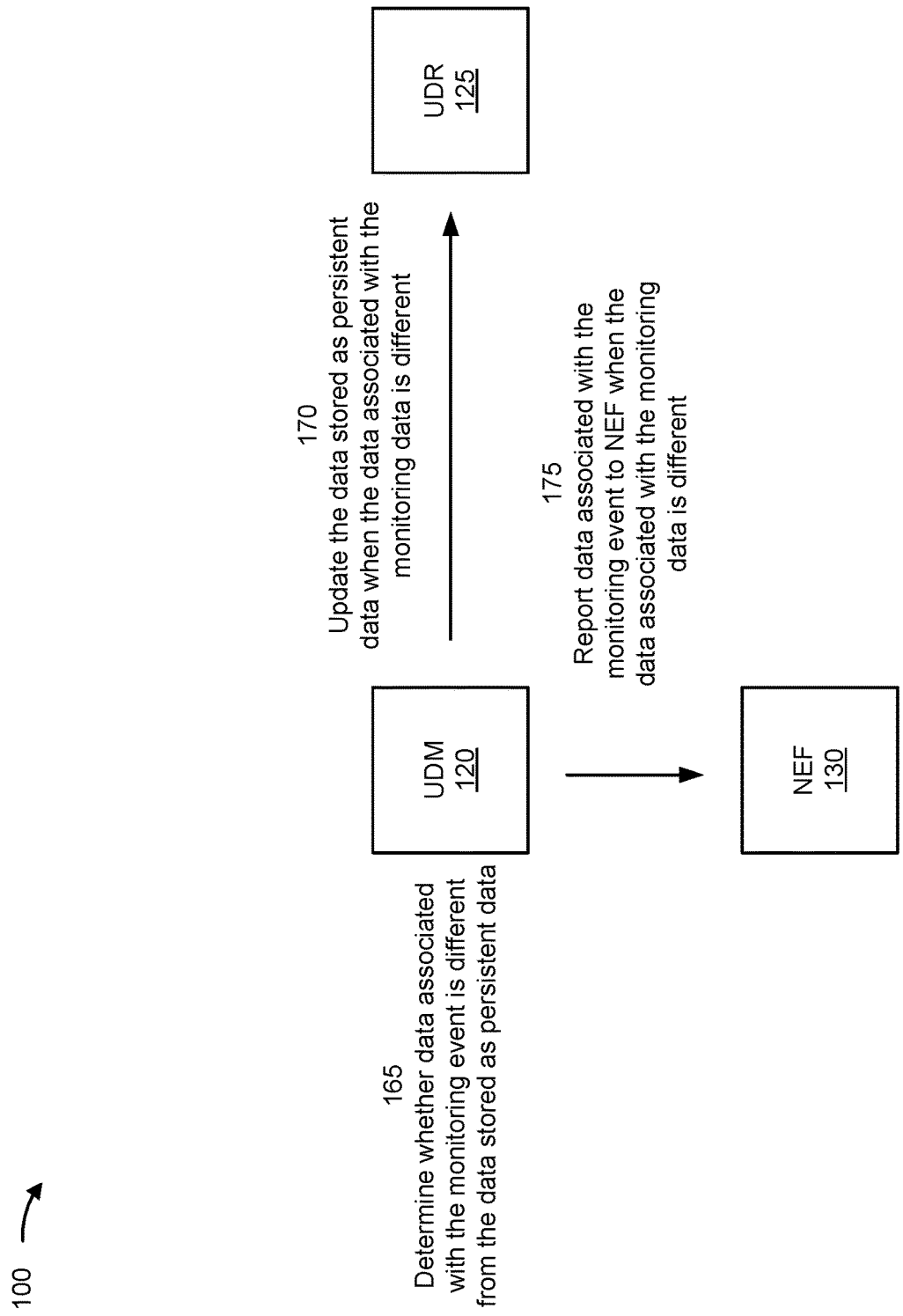

In some implementations, the UDM device 120 may determine that the data associated with the monitoring event for the subscriber and/or the UE 105 is stored in the UDR 125. As shown in FIG. 1D, and by reference number 165, the UDM device 120 may determine whether the data associated with the monitoring event is different from the data stored as persistent data in the UDR 125.

As an example, the data associated with the monitoring event received from the AMF 115 may indicate that the SUPI is associated with a particular PEI. The UDM device 120 may determine whether the data associated with the monitoring event stored in the UDR indicates that the SUPI is associated with the particular PEI. The UDM device 120 may determine that the data associated with the monitoring event is different from the data stored in the UDR 125 when the data stored in the UDR 125 indicates that the SUPI is associated with a PEI that is different from the particular PEI.

As shown by reference number 170, the UDM device 120 may update the data stored as persistent data when the data associated with the monitoring event is different from the stored data. As shown by reference number 175, the UDM device 120 may report the data associated with the monitoring event to the NEF 130 when the data associated with the monitoring event is different from the persistent data. By reporting the data associated with the monitoring event to the NEF 130 only when the data associated with the monitoring event is different from the stored data, an amount of data transmitted to the NEF 130 may be reduced, thereby conserving computing resources that may otherwise be utilized to transmit the data to the NEF 130 and/or to process the data by the NEF 130.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2A:
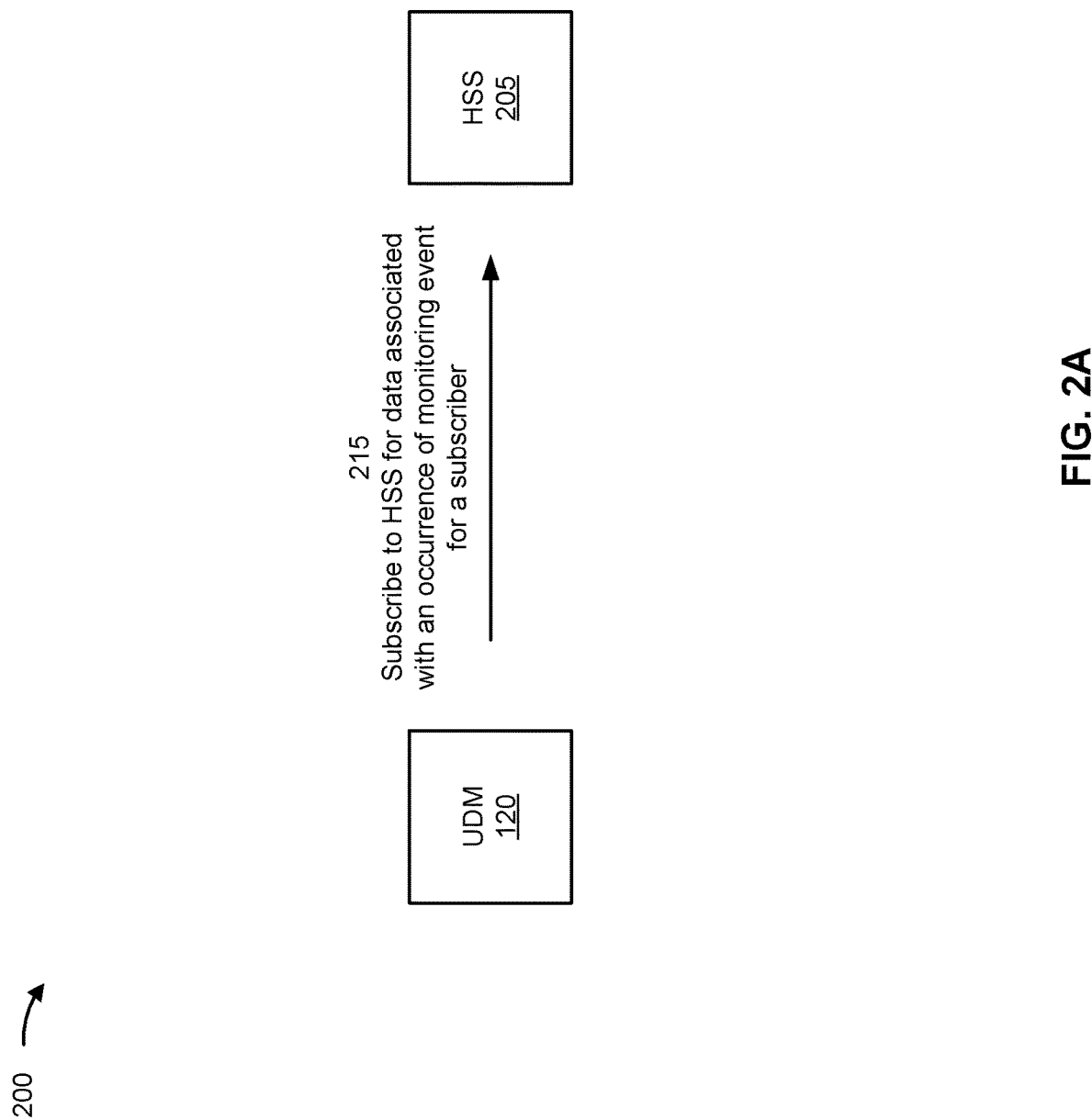
FIGS. 2A-2C are diagrams of an example associated with synchronizing subscriber data and events between networks.
Figure 2B:
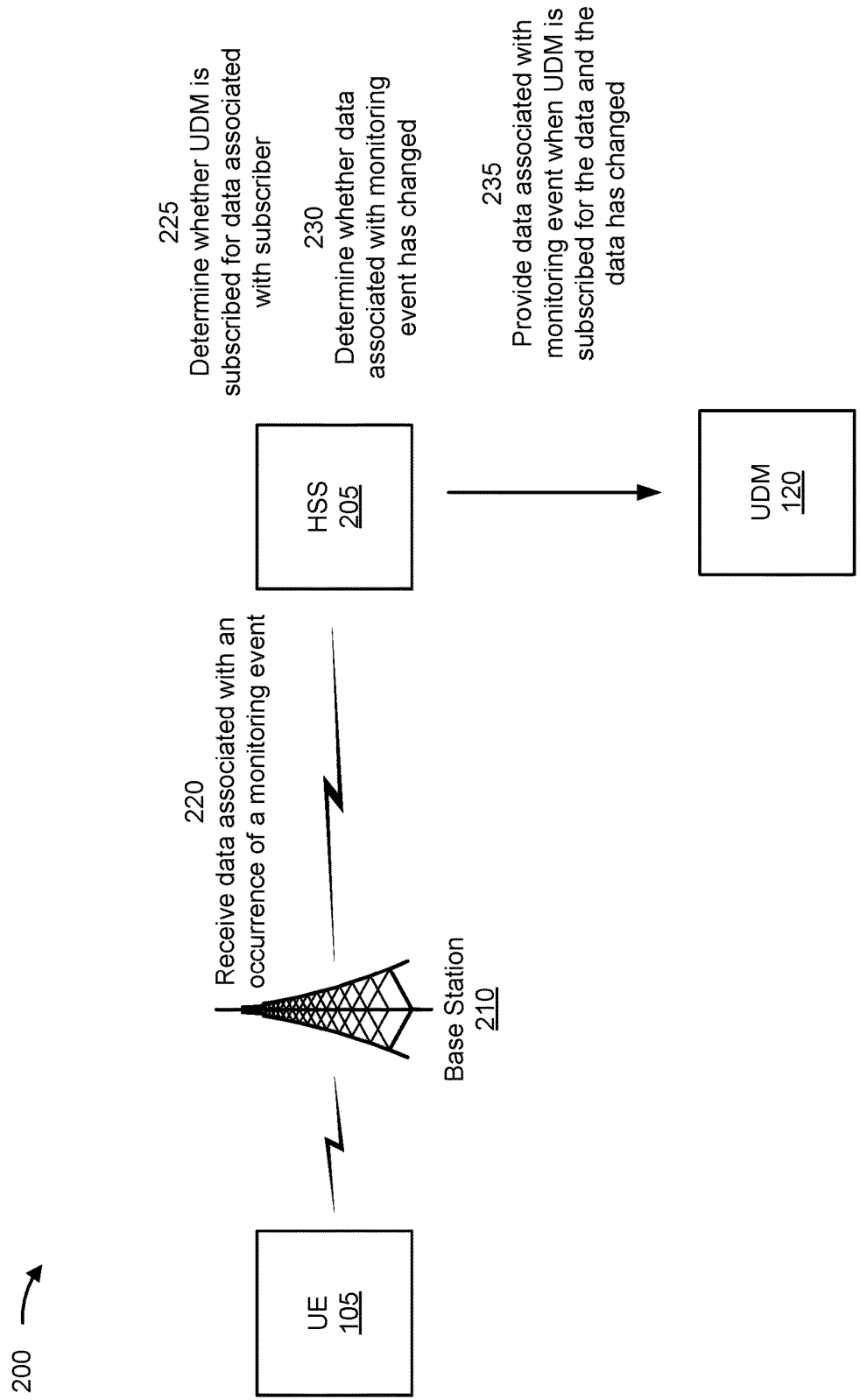
Figure 2C:
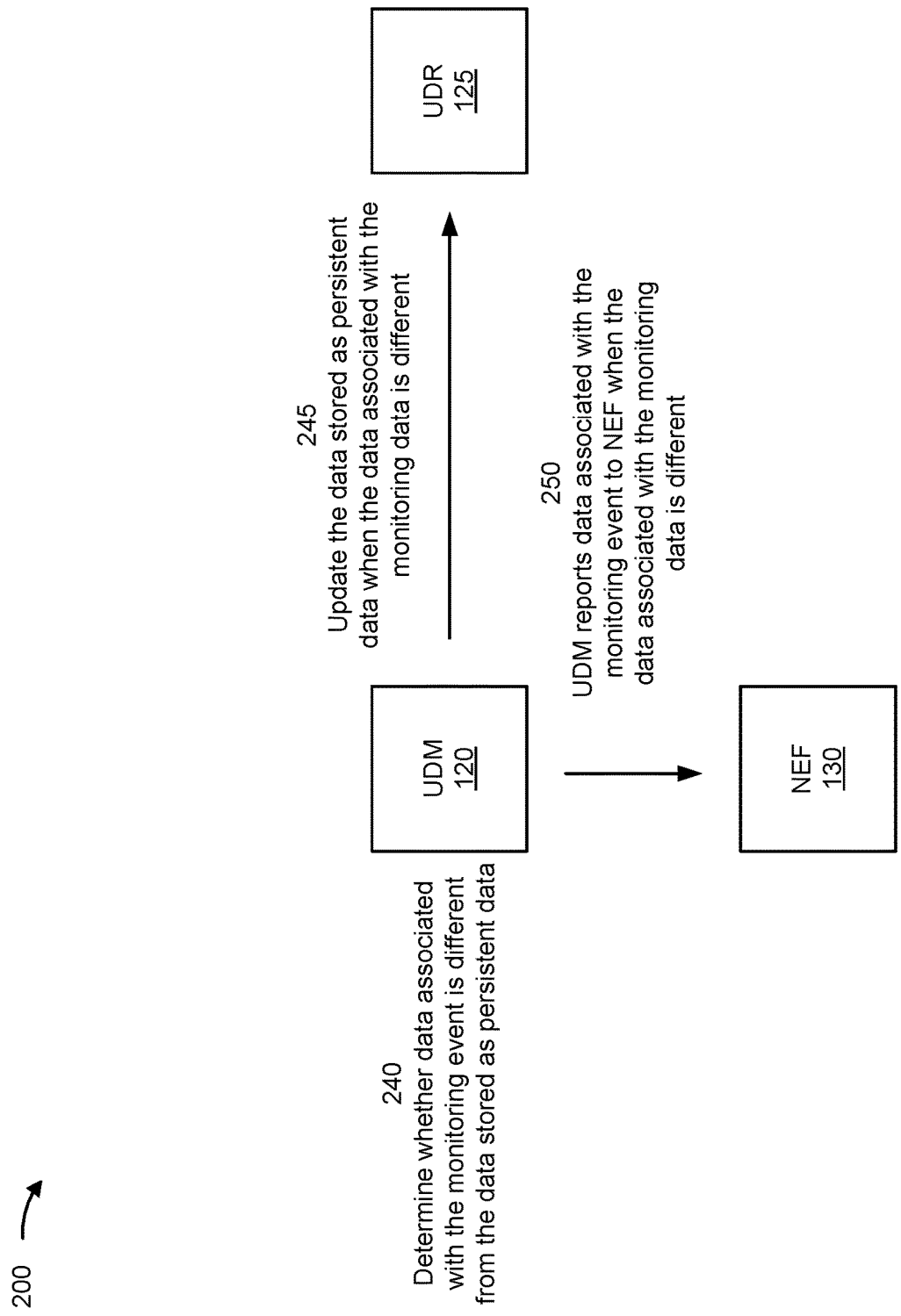

FIGS. 2A-2C are diagrams of an example 200 associated with synchronizing subscriber data and events between networks. As shown in FIGS. 2A-2C, example 200 includes a UE 105, an HSS 205, a base station 210, a UDM device 120, a UDR 125, and an NEF 130. The UE 105, the HSS 205, the base station 210, the UDM device 120, the UDR 125, and the NEF 130 are described in greater detail below with respect to FIGS. 3-5.

As shown in FIG. 2A, and by reference number 215, the UDM device 120 may subscribe to the HSS 205 for data associated with the monitoring event for a subscriber (e.g., a subscriber monitored by the UDM device 120). For example, the UDM device 120 may transmit a request for data associated with a monitoring event for a subscriber to the HSS 205. The request may include information identifying the subscriber, a SUPI associated with a UICC included on the UE 105, and/or a type of the monitoring event (e.g., a registration event associated with the UE 105 registering with a network associated with the HSS 205 and/or a handover of the UE 105 to the network associated with the HSS 205 and/or from the network associated with the HSS 205, among other examples).

The HSS 205 may receive the request and may store information indicating that the UDM device 120 is subscribed to the HSS 205 for data associated with a monitoring event for the subscriber. For example, the HSS 205 may store the information indicating that the UDM device 120 is subscribed to the HSS 205 for data associated with a monitoring event for the subscriber in a data structure that associates subscriptions for data with devices to which the data is to be transmitted.

As shown in FIG. 2B, and by reference number 220, the HSS 205 may receive data associated with the monitoring event. For example, the HSS 205 may receive the data associated with the monitoring event based on the UE 105 being handed over from a 5G network to the LTE network. In some implementations, the data associated with the monitoring event may include a SUPI associated with a UICC included in the UE 105 and/or a PEI associated with the UE 105.

As shown by reference number 225, the HSS 205 may determine whether the UDM device 120 is subscribed for data associated with the subscriber. In some implementations, the HSS 205 may determine that the UDM device 120 is subscribed for the data associated with the subscriber based on the information stored in the data structure that is associated with subscriptions for data with devices to which the data is to be transmitted.

As shown by reference number 230, the HSS 205 may determine whether the data associated with the monitoring event has changed. For example, the HSS 205 may access subscriber data associated with the subscriber and/or the UE 105 based on information included in the data associated with the monitoring event (e.g., the SUPI). The subscriber data may indicate that the SUPI is associated with a particular PEI. The HSS 205 may determine whether the data associated with the monitoring event indicates that the SUPI is associated with the particular PEI. The HSS 205 may determine that the data associated with the monitoring event has changed when the data associated with the monitoring event indicates that the SUPI is associated with a PEI that is different from the particular PEI.

As shown by reference number 235, the HSS 205 may provide the data associated with the monitoring event to the UDM device 120 when the UDM device 120 is subscribed for data associated with the subscriber and the data associated with the monitoring event has changed. By providing data associated with a monitoring event only for subscribers monitored by the UDM device 120 (rather than for every subscriber) and only when the data associated with the monitoring event has changed (rather than for every occurrence of a monitoring event), the HSS 205 may conserve computing resources that otherwise would have been utilized to transmit the data associated with a monitoring event for every subscriber and/or to process the transmitted data by the UDM device 120.

The UDM device 120 may receive the data associated with the monitoring event from the HSS 205 when the data associated with the monitoring event has changed and, as shown in FIG. 2C, and by reference number 240, the UDM device 120 may determine whether the data associated with the monitoring event received from the HSS 205 is different from data stored as persistent data for the subscriber. In some implementations, the UDM device 120 may determine whether the data associated with the monitoring event received from the HSS 205 is different from data stored as persistent data for the subscriber in a manner similar to that described above.

As shown by reference number 245, the UDM device 120 may update the data stored as persistent data when the data associated with the monitoring event received from the HSS 205 is different from the stored data. As shown by reference number 250, the UDM device 120 may report the data associated with the monitoring event to the NEF 130 when the data associated with the monitoring event received from the HSS 205 is different from the stored data. By reporting the data associated with the monitoring event to the NEF 130 only when the data associated with the monitoring event is different from the stored data, an amount of data transmitted to the NEF 130 may be reduced, thereby conserving computing resources that may otherwise be utilized to transmit the data to the NEF 130 and/or to process the data by the NEF 130.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
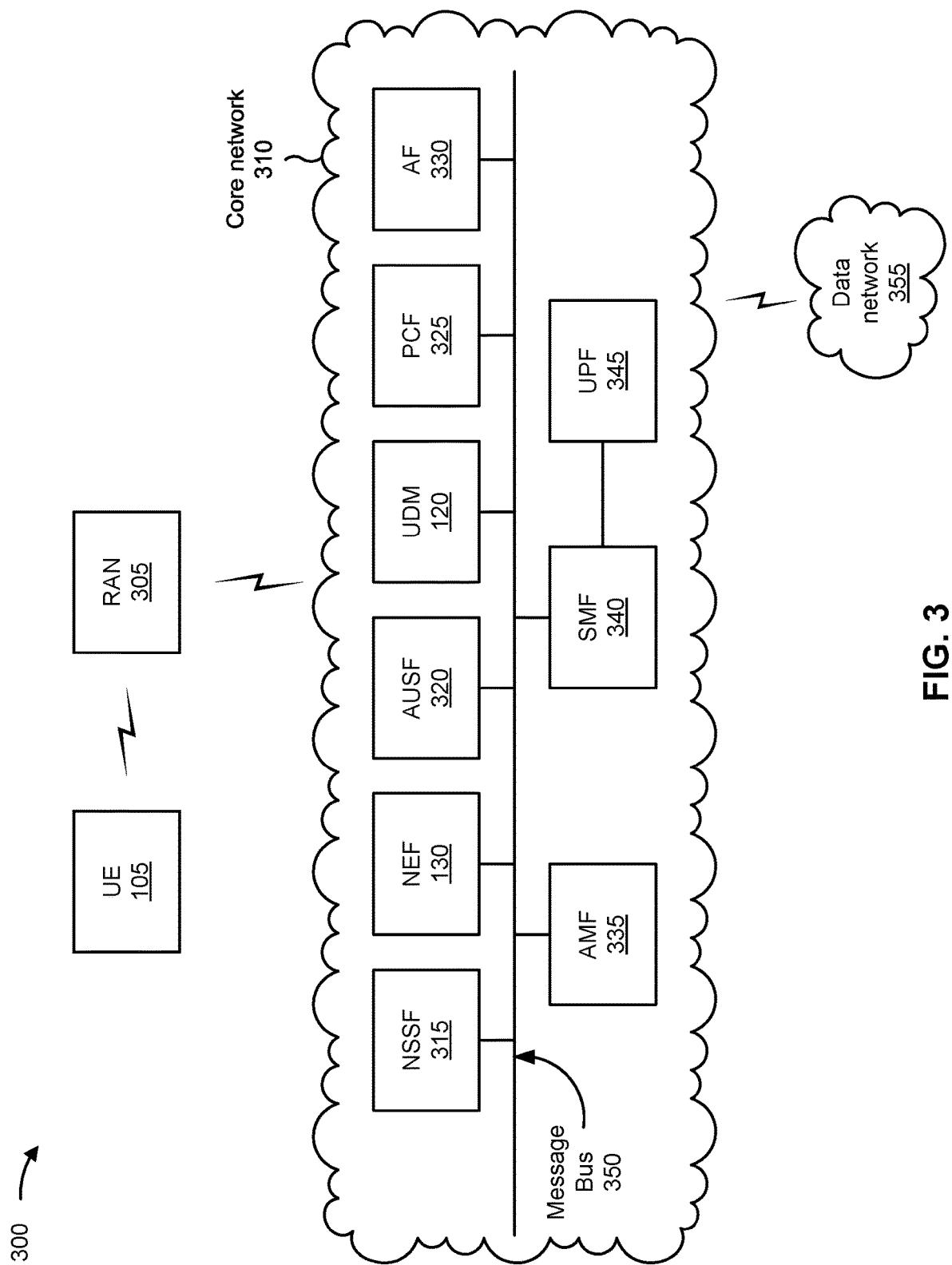
FIGS. 3 and 4 are diagrams of example environments in which systems and/or methods described herein may be implemented.

FIG. 3 is a diagram of an example environment 300 in which systems and/or methods described herein may be implemented. As shown in FIG. 3, example environment 300 may include a UE 105, a RAN 305, a core network 310, and a data network 355. Devices and/or networks of example environment 300 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone or a radiotelephone), an Iot Device, a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 305 may support, for example, a cellular radio access technology (RAT). RAN 305 may include one or more base stations 110, 210 (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 305 may transfer traffic between UE 105 (e.g., using a cellular RAT), one or more base stations (e.g., using a wireless interface or a backhaul interface, such as a wired backhaul interface), and/or core network 310. RAN 305 may provide one or more cells that cover geographic areas.

In some implementations, RAN 305 may perform scheduling and/or resource management for UE 105 covered by RAN 305 (e.g., UE 105 covered by a cell provided by RAN 305). In some implementations, RAN 305 may be controlled or coordinated by a network controller, which may perform load balancing, network-level configuration, and/or other operations. The network controller may communicate with RAN 305 via a wireless or wireline backhaul. In some implementations, RAN 305 may include a network controller, a self-organizing network (SON) module or component, or a similar module or component. In other words, RAN 305 may perform network control, scheduling, and/or network management functions (e.g., for uplink, downlink, and/or sidelink communications of UE 105 covered by RAN 305).

In some implementations, core network 310 may include an example functional architecture in which systems and/or methods described herein may be implemented. For example, core network 310 may include an example architecture of a 5G next generation (NG) core network included in a 5G wireless telecommunications system. While the example architecture of core network 310 shown in FIG. 3 may be an example of a service-based architecture, in some implementations, core network 310 may be implemented as a reference-point architecture and/or a 4G core network, among other examples.

As shown in FIG. 3, core network 310 may include a number of functional elements. The functional elements may include, for example, a network slice selection function (NSSF) 315, an NEF 130, an authentication server function (AUSF) 320, a UDM device 120, a policy control function (PCF) 325, an application function (AF) 330, an AMF 335, a session management function (SMF) 340, and/or a user plane function (UPF) 345. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 315 includes one or more devices that select network slice instances for UE 105. By providing network slicing, NSSF 315 allows an operator to deploy multiple substantially independent end-to-end networks potentially with the same infrastructure. In some implementations, each slice may be customized for different services.

NEF 130 includes one or more devices that support exposure of capabilities and/or events in the wireless telecommunications system to help other entities in the wireless telecommunications system discover network services.

AUSF 320 includes one or more devices that act as an authentication server and support the process of authenticating UE 105 in the wireless telecommunications system.

UDM device 120 includes one or more devices that store user data and profiles in the wireless telecommunications system. UDM device 120 may be used for fixed access and/or mobile access in core network 310.

PCF 325 includes one or more devices that provide a policy framework that incorporates network slicing, roaming, packet processing, and/or mobility management, among other examples.

AF 330 includes one or more devices that support application influence on traffic routing, access to NEF 130, and/or policy control, among other examples.

AMF 335 includes one or more devices that act as a termination point for non-access stratum (NAS) signaling and/or mobility management, among other examples.

SMF 340 includes one or more devices that support the establishment, modification, and release of communication sessions in the wireless telecommunications system. For example, SMF 340 may configure traffic steering policies at UPF 345 and/or may enforce user equipment IP address allocation and policies, among other examples.

UPF 345 includes one or more devices that serve as an anchor point for intraRAT and/or interRAT mobility. UPF 345 may apply rules to packets, such as rules pertaining to packet routing, traffic reporting, and/or handling user plane QoS, among other examples.

Message bus 350 represents a communication structure for communication among the functional elements. In other words, message bus 350 may permit communication between two or more functional elements.

Data network 355 includes one or more wired and/or wireless data networks. For example, data network 355 may include an Internet protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
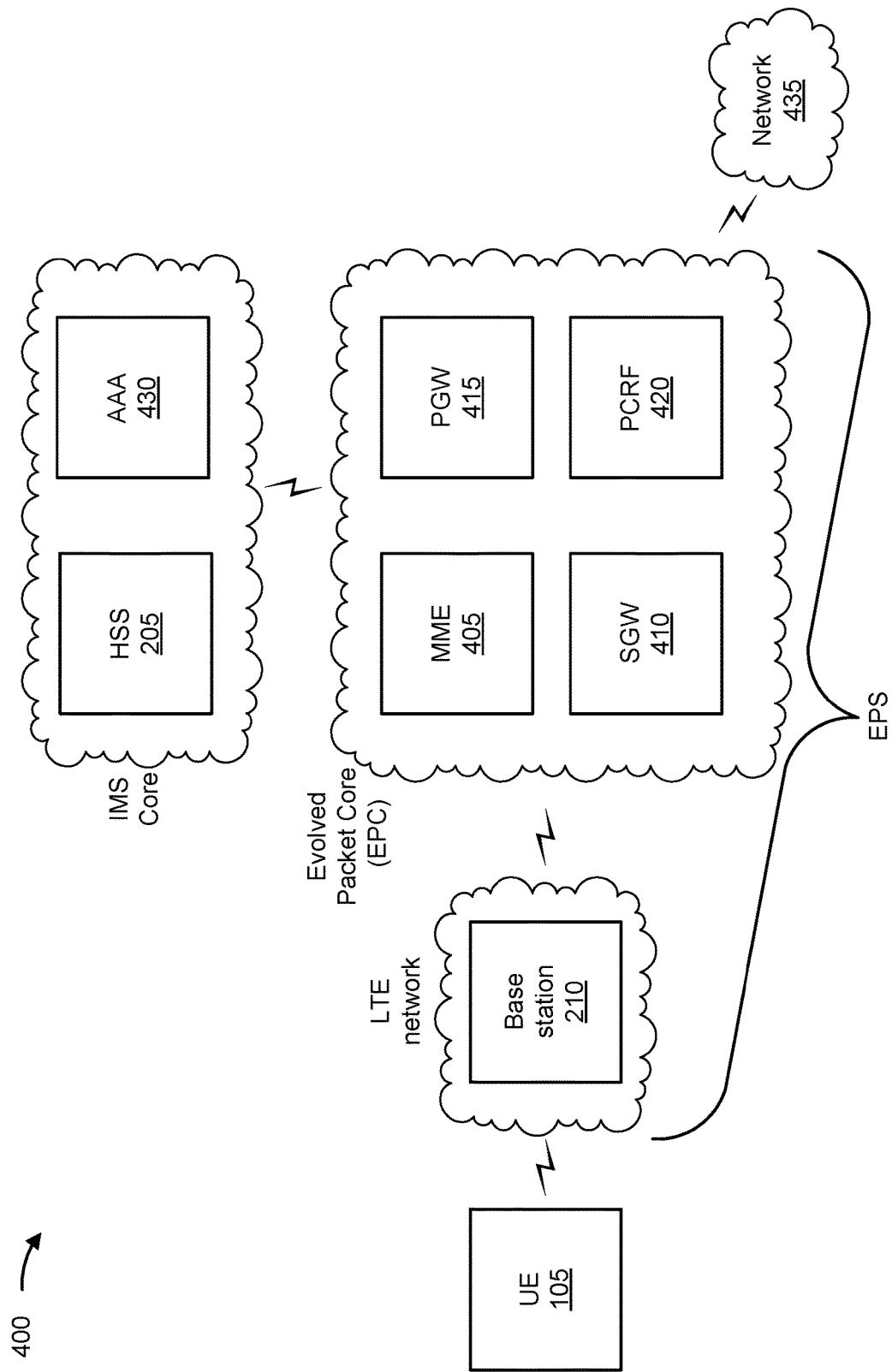

FIG. 4 is a diagram of an example environment 400 in which systems and/or methods, described herein, may be implemented. As shown in FIG. 4, environment 400 may include a UE 105, a base station 210, a mobility management entity device (MME) 405, a serving gateway (SGW) 410, a packet data network gateway (PGW) 415, a policy and charging rules function (PCRF) 420, an HSS 205, an authentication, authorization, and accounting server (AAA) 430, and a network 435. Devices of environment 400 may interconnect via wired connections, wireless connections, or a combination of wired and wireless connections.

Some implementations are described herein as being performed within an LTE network for explanatory purposes. Some implementations may be performed within a network that is not an LTE network, such as a third generation (3G) network or a 5G network.

Environment 400 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 210 that take the form of evolved Node Bs (eNBs) via which UE 105 communicates with the EPC. The EPC may include MME 405, SGW 410, and/or PGW 415 to enable UE 105 to communicate with network 435 and/or an IMS core. The IMS core may include HSS 205 and/or AAA 430, and may manage device registration and authentication, session initiation, and/or other operations associated with UEs 105. HSS 205 and/or AAA 430 may reside in the EPC and/or the IMS core.

UE 105 includes one or more devices capable of communicating with other UEs 105, base station 210, and/or a network (e.g., network 435). For example, UE 105 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. UE 105 may send traffic to and/or receive traffic from another UE 105 and/or network 435 (e.g., via base station 210, SGW 410, and/or PGW 415).

Base station 210 includes one or more devices capable of transferring traffic, such as audio, video, text, and/or other traffic, destined for and/or received from UE 105. In some implementations, base station 210 may include an eNB associated with the LTE network that receives traffic from and/or sends traffic to network 435 via SGW 410 and/or PGW 415. Additionally, or alternatively, one or more base stations 210 may be associated with a RAN that is not associated with the LTE network. Base station 210 may send traffic to and/or receive traffic from UE 105 via an air interface. In some implementations, base station 210 may include a small cell base station, such as a base station of a microcell, a picocell, or a femtocell.

MME 405 includes one or more devices, such as one or more server devices, capable of managing authentication, activation, deactivation, and/or mobility functions associated with UE 105. In some implementations, MME 405 may perform operations relating to authentication of UE 105. Additionally, or alternatively, MME 405 may facilitate the selection of a particular SGW 410 and/or a particular PGW 415 to provide traffic to and/or from UE 105. MME 405 may perform operations associated with handing off UE 105 from a first base station 210 to a second base station 210 when UE 105 is transitioning from a first cell associated with the first base station 210 to a second cell associated with the second base station 210. Additionally, or alternatively, MME 405 may select another MME (not pictured), to which UE 105 should be handed off (e.g., when UE 105 moves out of range of MME 405).

SGW 410 includes one or more devices capable of routing packets. For example, SGW 410 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 410 may aggregate traffic received from one or more base stations 210 associated with the LTE network and may send the aggregated traffic to network 435 (e.g., via PGW 415) and/or other network devices associated with the EPC and/or the IMS core. SGW 410 may receive traffic from network 435 and/or other network devices and may send the received traffic to UE 105 via base station 210. Additionally, or alternatively, SGW 410 may perform operations associated with handing off UE 105 to and/or from an LTE network.

PGW 415 includes one or more devices capable of providing connectivity for UE 105 to external packet data networks (e.g., other than the depicted EPC and/or LTE network). For example, PGW 415 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 415 may aggregate traffic received from one or more SGWs 410 and may send the aggregated traffic to network 435. Additionally, or alternatively, PGW 415 may receive traffic from network 435, and may send the traffic to UE 105 via SGW 410 and base station 210. PGW 415 may record data usage information (e.g., byte usage), and may provide the data usage information to AAA 430.

PCRF 420 includes one or more devices, such as one or more server devices, capable of providing policy control decision and flow-based charging control functionalities. For example, PCRF 420 may provide network control regarding service data flow detection, gating, and/or quality of service (QoS) and flow-based charging, among other examples. In some implementations, PCRF 420 may determine how a certain service data flow is to be treated and may ensure that user plane traffic mapping and treatment is in accordance with a user subscription profile.

HSS 205 includes one or more devices, such as one or more server devices, capable of managing (e.g., receiving, generating, storing, processing, and/or providing) information associated with UE 105. For example, HSS 205 may manage subscription information associated with UE 105, such as information that identifies a subscriber profile of a user associated with UE 105, information that identifies services and/or applications that are accessible to UE 105, location information associated with UE 105, a network identifier (e.g., a network address) that identifies UE 105, information that identifies a treatment of UE 105 (e.g., quality of service information, a quantity of minutes allowed per time period, a quantity of data consumption allowed per time period, etc.), and/or similar information. HSS 205 may provide this information to one or more other devices of environment 400 to support the operations performed by those devices.

AAA 430 includes one or more devices, such as one or more server devices, that perform authentication, authorization, and/or accounting operations for communication sessions associated with UE 105. For example, AAA 430 may perform authentication operations for UE 105 and/or a user of UE 105 (e.g., using one or more credentials), may control access, by UE 105, to a service and/or an application (e.g., based on one or more restrictions, such as time-of-day restrictions, location restrictions, single or multiple access restrictions, read/write restrictions, etc.), may track resources consumed by UE 105 (e.g., a quantity of voice minutes consumed, a quantity of data consumed, etc.), and/or may perform similar operations.

Network 435 includes one or more wired and/or wireless networks. For example, network 435 may include a cellular network (e.g., a 5G network, an LTE network, a 3G network, a code division multiple access (CDMA) network, etc.), a PLMN, a LAN, a WAN, an MAN, a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
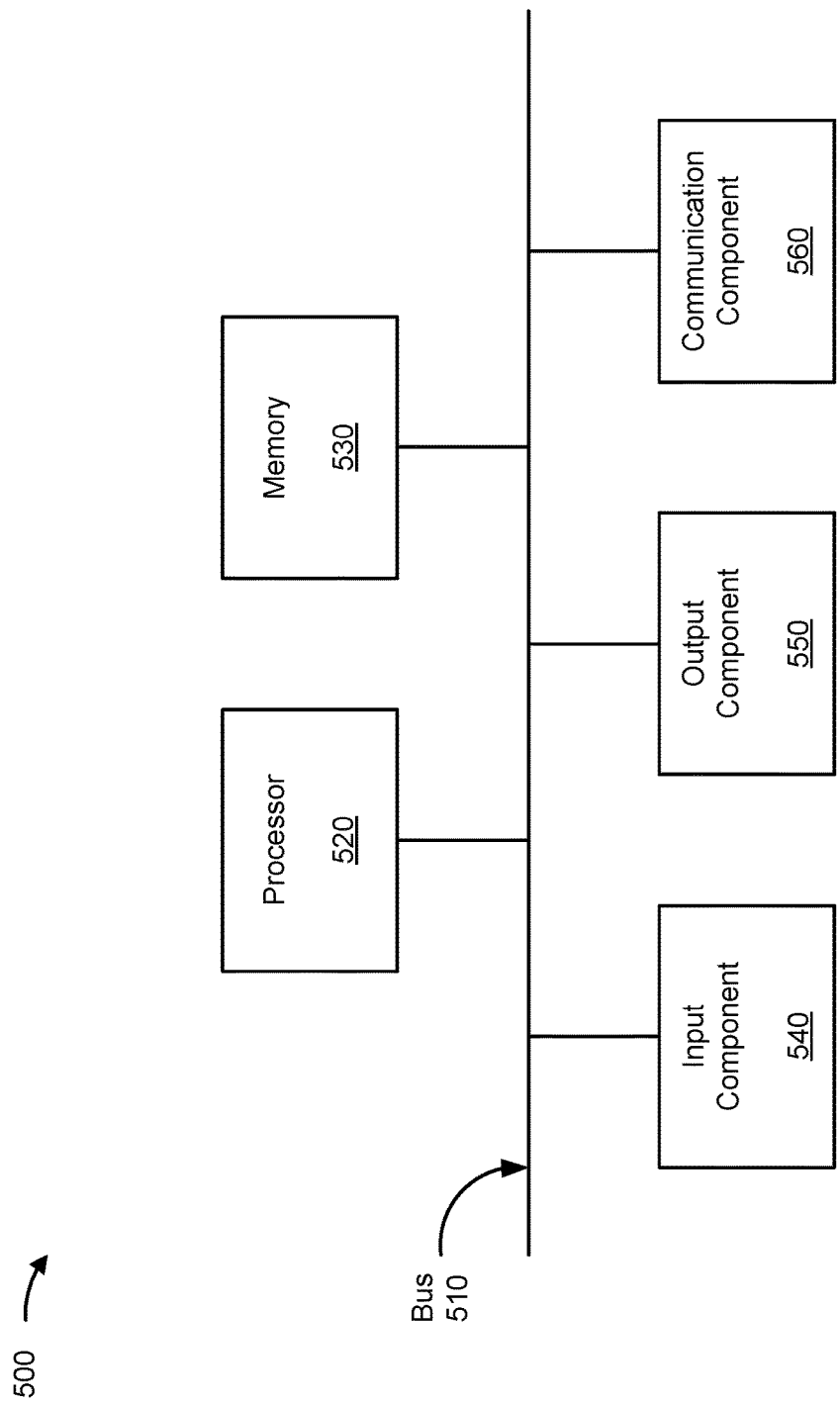
FIG. 5 is a diagram of example components of one or more devices of FIGS. 3 and 4.

FIG. 5 is a diagram of example components of a device 500, which may correspond to UE 105, base station 110, AMF 115, UDM device 120, UDR 125, NEF 130, HSS 205, base station 210, NSSF 315, AUSF 320, PCF 325, AF 330, AMF 335, SMF 108 340, UPF 345, MME 405, SGW 410, PGW 415, PCRF 420, and/or AAA 430. In some implementations, UE 105, base station 110, AMF 115, UDM device 120, UDR 125, NEF 130, HSS 205, base station 210, NSSF 315, AUSF 320, PCF 325, AF 330, AMF 335, SMF 108 340, UPF 345, MME 405, SGW 410, PGW 415, PCRF 420, and/or AAA 430 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

FIG. 6 is a flowchart of an example process 600 associated with systems and methods for synchronizing subscriber data and events between networks. In some implementations, one or more process blocks of FIG. 6 may be performed by a network device (e.g., UDM device 120). In some implementations, one or more process blocks of FIG. 6 may be performed by another device or a group of devices separate from or including the network device, such as a UE (e.g., UE 105), a base station (e.g., base station 110, 210), an NSSF (e.g., NSSF 315), an NEF (e.g., NEF 130), an AUSF (e.g., AUSF 320), a PCF (e.g., PCF 325), an AF (e.g., AF 330), and AMF (e.g., AMF 335), an SMF (e.g., SMF 340), a UPF (e.g., UPF 345), an HSS (e.g., HSS 205), an MME (e.g., MME 405), a SGW (e.g., SGW 410), a PGW (e.g., PGW 415), a PCRF (e.g., PCRF 420), and/or an AAA (e.g., AAA 430). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include storing first data associated with a monitoring event (block 610). For example, the network device may store first data associated with a monitoring event, wherein the first data is associated with a subscriber and is stored as persistent data in a memory associated with the network device, as described above. In some implementations, the network device may include a UDM device.

In some implementations, the monitoring event includes a handoff of a user device from a first network to a second network that is different from the first network. In some implementations, the first data is stored as an attribute of a subscriber data management resource.

As further shown in FIG. 6, process 600 may include receiving second data associated with an occurrence of the monitoring event (block 620). For example, the network device may receive second data associated with an occurrence of the monitoring event from an AMF or an HSS, as described above.

In some implementations, the network device subscribes to another network device included in another core network for data associated with the monitoring event. In some implementations, the other network device includes an HSS. The network device may receive the second data from the other network device based on subscribing to the other network device for the data associated with the monitoring event.

As further shown in FIG. 6, process 600 may include determining that the second data indicates a change to the first data (block 630). For example, the network device may determine that the second data indicates a change to the first data based on data stored as persistent data in a UDR, as described above.

In some implementations, the first data indicates an association between a SUPI and a PEI and the second data indicates an association between the SUPI and another PEI. The network device may determine that the second data indicates a change to the first data based on the second data indicating the associated with between the SUPI and the other PEI.

As further shown in FIG. 6, process 600 may include providing the second data to an NEF based on the second data indicating the change to the first data (block 640). For example, the network device may provide the second data to an NEF based on the second data indicating the change to the first data, as described above. The network device may not provide the second data to the NEF when the second data does not indicate the change to the first data.

In some implementations, the network device may receive third data associated with another occurrence of the monitoring event. The network device may determine that the third data corresponds to the data stored as persistent data. The network device may drop the third data without providing the third data to the NEF function based on the third data corresponding to the data stored as the persistent data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   transmitting, by a network device included in a core network, a request for data associated with a monitoring event for a subscriber,
   wherein the request includes information identifying the subscriber, and
   wherein the request causes information indicating that the network device is subscribed for data associated with the monitoring event to be stored in a data structure that associates subscriptions for data with devices to which the data is to be transmitted;

storing, by the network device, first data associated with
the monitoring event, wherein the first data indicates an
association between an identifier associated with the
subscriber and an identifier associated with a user
equipment (UE);
receiving, by the network device and based on the network device being subscribed for data associated with
the monitoring event, second data associated with an
occurrence of the monitoring event, wherein the second
data indicates an association between the identifier
associated with the subscriber and an identifier associated with another UE;
determining, by the network device, that the second data
indicates a change to the first data; and
providing, by the network device, the second data to a
network exposure function (NEF) based on the second
data indicating the change to the first data, wherein the
second data is not provided to the NEF when the second
data does not indicate the change to the first data.

2. The method of claim 1, wherein the identifier associated with the subscriber is a subscription permanent identifier (SUPI), the identifier associated with the UE is a permanent equipment identifier (PEI), and the identifier associated with the other UE is another PEI.

3. The method of claim 1, wherein transmitting the request for data associated with the monitoring event for the subscriber comprises:
transmitting the request to another network device included in another core network.

4. The method of claim 3, wherein the network device includes a unified data management device and the other network device includes a home subscriber service.

5. The method of claim 1, further comprising:
receiving third data associated with another occurrence of the monitoring event;
determining that the third data corresponds to the second data; and
dropping the third data without providing the third data to the NEF function based on the third data corresponding to the second data.

6. The method of claim 1, wherein the monitoring event includes a handoff of a user device from a first network to a second network that is different from the first network.

7. The method of claim 1, wherein storing the first data comprises:
storing the first data as an attribute of a subscriber data management resource.

8. A non-transitory computer-readable medium storing a set of instructions, the set of instructions comprising:
one or more instructions that, when executed by one or more processors of a network device, cause the network device to:
transmit a request for data associated with a monitoring event for a subscriber,
wherein the request includes information identifying the subscriber, and
wherein the request causes information indicating that the network device is subscribed for data associated with the monitoring event to be stored in a data structure that associates subscriptions for data with devices to which the data is to be transmitted;
store first data associated with a monitoring event, wherein the first data indicates an association between an identifier associated with the subscriber and an identifier associated with a user equipment (UE);
receive, based on the network device being subscribed for data associated with the monitoring event, second data associated with an occurrence of the monitoring event, wherein the second data indicates an association between the identifier associated with the subscriber and an identifier associated with another UE;
determine that the second data indicates a change to the first data; and
provide the second data to a network exposure function (NEF) based on the second data indicating the change to the first data, wherein the second data is not provided to the NEF when the second data does not indicate the change to the first data.

9. The non-transitory computer-readable medium of claim 8, wherein the identifier associated with the subscriber is a subscription permanent identifier (SUPI), the identifier associated with the UE is a permanent equipment identifier (PEI), and the identifier associated with the other UE is another PEI.

10. The non-transitory computer-readable medium of claim 8, wherein the one or more instructions, that cause the network device to transmit the request for data associated with the monitoring event for the subscriber, cause the network device to:
transmit the request to another network device included in another core network.

11. The non-transitory computer-readable medium of claim 10, wherein the network device includes a unified data management device and the other network device includes a home subscriber service.

12. The non-transitory computer-readable medium of claim 8, wherein the one or more instructions further cause the network device to:
receive third data associated with another occurrence of the monitoring event;
determine that the third data corresponds to the second data; and
drop the third data without providing the third data to the NEF function based on the third data corresponding to the second data.

13. The non-transitory computer-readable medium of claim 8, wherein the monitoring event includes a handoff of a user device from a first network to a second network that is different from the first network.

14. The non-transitory computer-readable medium of claim 8, wherein the one or more instructions, that cause the network device to store the first data, cause the network device to:
store the first data as an attribute of a subscriber data management resource.

15. A network device, comprising:
one or more processors configured to:
transmit a request for data associated with a monitoring event for a subscriber,
wherein the request includes information identifying the subscriber, and
wherein the request causes information indicating that the network device is subscribed for data associated with the monitoring event to be stored in a data structure that associates subscriptions for data with devices to which the data is to be transmitted;
store first data associated with a monitoring event, wherein the first data indicates an association between an identifier associated with the subscriber and an identifier associated with a user equipment (UE);

receive, based on the network device being subscribed for data associated with the monitoring event, second data associated with an occurrence of the monitoring event, wherein the second data indicates an association between the identifier associated with the subscriber and an identifier associated with another UE;

determine that the second data indicates a change to the first data; and provide the second data to a network exposure function (NEF) based on the second data indicating the change to the first data, wherein the second data is not provided to the NEF when the second data does not indicate the change to the first data.

16. The network device of claim 15, wherein the identifier associated with the subscriber is a subscription permanent identifier (SUPI), the identifier associated with the UE is a permanent equipment identifier (PEI), and the identifier associated with the other UE is another PEI.

17. The network device of claim 15, wherein the one or more processors, to transmit the request for data associated with the monitoring event for the subscriber, are configured to:

transmit the request to another network device included in another core network.

18. The network device of claim 15, wherein the one or more processors are further configured to:

receive third data associated with another occurrence of the monitoring event;

determine that the third data corresponds to the second data; and drop the third data without providing the third data to the NEF function based on the third data corresponding to the second data.

19. The network device of claim 15, wherein the monitoring event includes a handoff of a user device from a first network to a second network that is different from the first network.

20. The network device of claim 15, wherein the one or more processors, to store the first data, are configured to:

store the first data as an attribute of a subscriber data management resource.

* * * * *